Oct. 4, 1966　　　D. W. PARTRIDGE　　　3,276,728
MAIN GEAR SKID
Filed Dec. 11, 1964

INVENTOR.
DICK WHITE PARTRIDGE

BY J B Holden
ATTORNEY

United States Patent Office 3,276,728
Patented Oct. 4, 1966

3,276,728
MAIN GEAR SKID
Dick White Partridge, Akron, Ohio, assignor to The Goodyear Tire & Rubber Company, Akron, Ohio, a corporation of Ohio
Filed Dec. 11, 1964, Ser. No. 417,548
6 Claims. (Cl. 244—108)

This invention relates to a main gear skid, and more particularly to a wire brush ski type landing gear for an aircraft which will withstand elevated temperatures and which is adaptable to slightly abnormal and irregular landing surfaces.

Heretofore, it has been known that ski type landing gears and devices have been used for main landing gear skids for the X-15 high performance, high speed jet aircraft. This has been nothing more than a ski shaped metal plate and is adapted only for landing on a dry salt lake bed. A ski type landing gear is necessary with this type of aircraft because of the high temperature conditions encountered on re-entry into the earth's atmosphere thereby making the use of a conventional wheel, brake and tire unit impractical. Ski type landing gears have been well known for aircraft adaptable to landing on the snow and water surfaces. Hower, it is necessary for a ski type landing device capable of imposing high friction stopping rates on concrete, asphalt or irregular surfaces to be provided.

Therefore, it is the general object of the present invention to avoid and overcome the difficulties and objections to prior art practices and meet the needs of the art by providing a ski type landing device adaptable for aircraft which utilizes metal wire knots mounted to a ski shaped frame so that the wire ends of the knots define a ski shape bottom surface with the knots packed in closed spaced longitudinal and lateral relationship to the frame thereby achieving a high friction co-efficient because of the plurality of wire ends engaging the landing surface while simultaneously providing a cushioning effect because of the resilient nature of the metal knots.

Another object of the invention is to provide a ski type landing device utilizing a wire brush ski shaped bottom surface where the coefficient of friction can be changed by varying the number of exposure wire brush surfaces, varying the diameter of the wire and changing the wire material, and the resiliency or adaptability of the device to rough terrain can be adjusted by varying the resiliency of the wire brush surface.

A further object of the invention is to provide a ski type landing device which utilizes wire knots secured to a frame with the wire ends of the knots defining the ski shaped bottom surface with means provided to securely mount the other ends of the wire knots to the frame so that the wire knots are in fixed relationship with each other and with the frame.

A further object of the invention is to provide a ski type landing device which is pivotal in a vertical plane parallel to the landing flight path of the aircraft to allow riding over uneven terrain, and where shock absorber means are utilized to cushion the pivotal action of the device.

A further boject of the invention is to provide a wire brush ski type landing device which is capable of sustaining the extremely high temperatures encountered upon reentry of an aircraft into the earth's atmosphere, even if the device is exposed to the atmosphere.

The aforesaid objects of the invention and other objects which will become apparent as the description proceeds are achieved by providing in a landing skid for an aircraft the combination of elongated frame means having a bottom defining a ski shape, a plurality of wire knot means operatively affixed to the bottom of the frame means and projecting normal thereto so the ends of the knots together define a ski shape, the knot means being mounted at one end in fixed relationship to each other and to the frame means while having a bending resiliency along their length toward the free end, and means operatively affixed to the frame means to pivotally mount the frame means to the aircraft so the frame means is substantially parallel to the flight path of the aircraft and pivotal in a vertical plane parallel to the flight path of the aircraft.

For a better understanding of the invention reference should be had to the accompanying drawings wherein.

While the invention could be utilized as a permanent ski type landing skid for conventional jet aircraft, it is primarily adaptable to high performance aircraft encountering high heat conditions during reentry into the earth's atmosphere and hence it has been so illustrated and will be so described.

Figure 1:
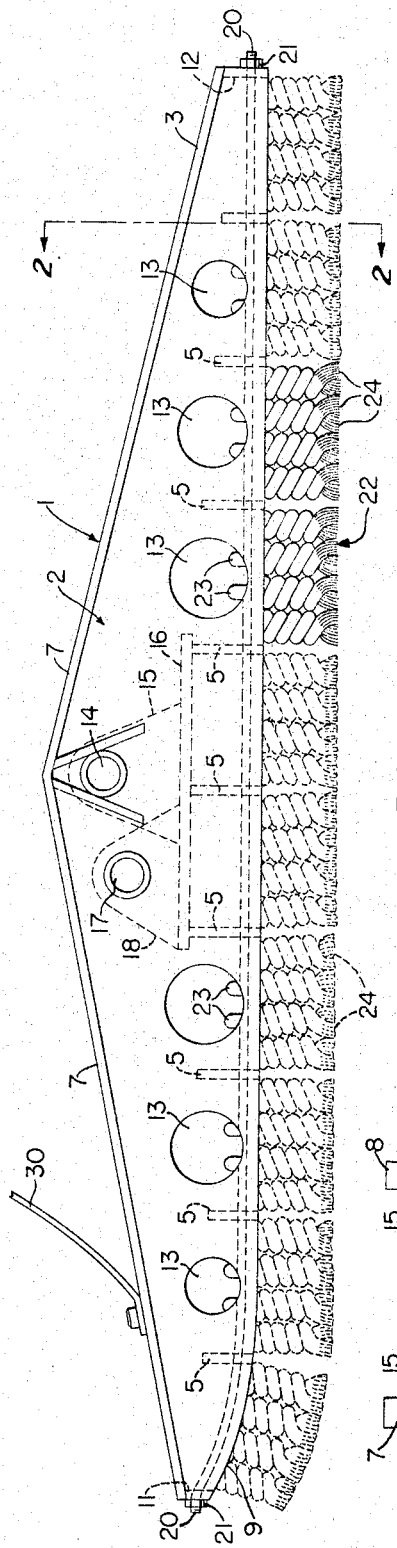
FIGURE 1 is a side elevational view of one embodiment of the wire brush ski type landing skid device of the invention.
Figure 2:
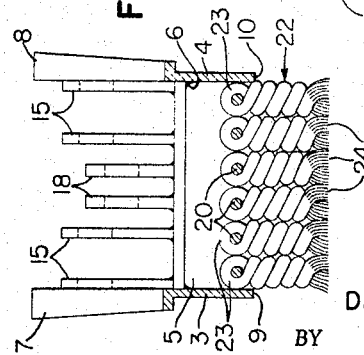
FIGURE 2 is a vertical cross sectional view taken on line 2—2 of FIGURE 1.

With particular reference to FIGURE 1 of the drawings, the numeral 1 indicates generally a wire brush ski type landing skid device comprising a frame 2 having substantially parallel sides 3 and 4 with a plurality of lateral spacing and reinforcing brackets 5 operatively connected to the sides 3 and 4 by suitable means, such as welds indicated by numeral 6. The sides 3 and 4 have strengthening top ribs 7 and 8 generally formed integral therewith. The bottom edges 9 and 10 of the sides 3 and 4 define a substantially ski shaped surface. In other words, the surface defined is long and essentially parallel to the ground with an upturned forward portion. End plates 11 and 12 close the ends between the side walls 3 and 4. Lightening holes 13 are provided to decrease the weight and increase the strength of the structure in a well known manner.

In order to pivotally mount the frame 2 to the aircraft substantially in alignment with the flight path thereof so that it can pivot in a vertical plane substantially parallel to the flight path of the aircraft, a pivotal mounting hole 14 is provided in the side walls 3 and 4 with internal brace supports 15 provided to increase the strength of the pivotal mounting. The brace supports 15 are mounted to a bed 16 which is operatively secured to the middle three supporting brackets 5, by convenient means such as welding. Thus, it is seen that a solid structural relationship which can pivotally mount the frame 2 to a landing strut or landing gear appendage (not shown) on an aircraft.

The invention also contemplates that the pivotal movement of the frame 2 be damped. To this end mounting holes 17 are provided to receive a shock absorber mechanism (not shown) adapted to be connected to the aircraft. Support means 18 also mounted to the base plate 16 provide further support for a shaft (not shown) adapted to be passed through the holes 17 to secure a shock absorber mechanism (not shown) in position.

The invention contemplates that all the portions of the frame 2 described heretofore will be made from a nickel base alloy capable of withstanding temperatures in the vicinity of 1500 to 2000 degrees F. without structural weakness or deterioration.

As an important feature of the invention, a plurality of rods 20 are adapted to be slidably positioned through receiving holes in the brackets 5 and the end plates 11 and 12 to be positioned in equally spaced adjacent relationship substantially parallel to the longitudinal direction of the frame 2 and to define a ski shape similar to the bottom edges 9 and 10 of the sides 3 and 4. The rods 20 may be secured into position by suitable means, such as welding, nuts, etc. Holding nuts 21 are illustrated in the drawings.

Figure 3:
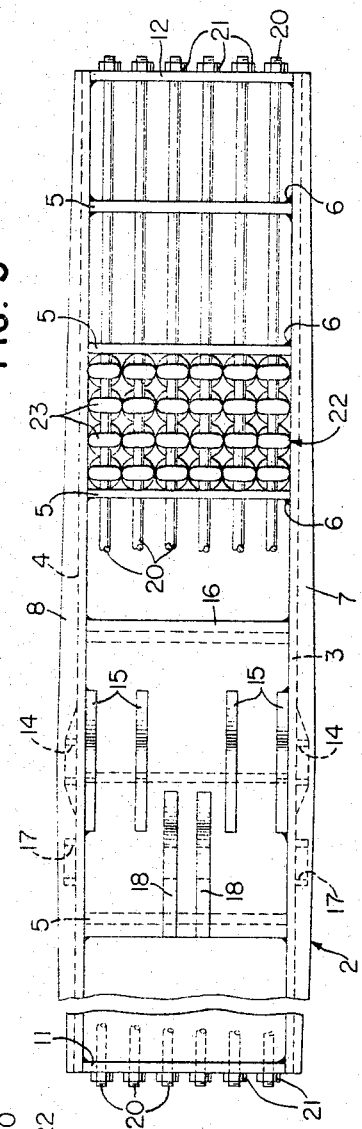
FIGURE 3 is a partially broken away plan view of the skid device of FIGURE 1.

A plurality of wire knots, indicated generally by numeral 22, are wrapped to define eyes 23 at one end and cut wire ends 24 at the other end. The knots 22 are operatively positioned so that the rods 20 pass through the eyes 23 to securely position the knots 22 in relation to each other and to the frame 2. With reference to all the drawings, it is seen that the knots 22 are packed between the compartment areas defined by the sides 3 and 4 and the brackets 5. FIGURE 3 has been broken away to particularly show the relationship of the rods 20 extending longitudinally between the sides 3 and 4 and how the knots 23 completely fill the space defined by the brackets 5 and the sidewalls 3 and 4. Although FIGURE 3 only shows one space completely filled, it should be understood, as shown in FIGURE 1, that all the spaces between the sides 3 and 4 and the brackets 5 are completely filled with knots 22 so that the wire ends 24 define a ski shape on their bottoms similar to the shape defined by the bottoms 9 and 10 of the sides 3 and 4, as well as defined by the rods 20.

The invention contemplates that the knots shall be prewrapped from a nickel base alloy, a high resistant stainless steel, or any other suitable material. Since the actual coefficient of friction achieved by the skid device 1 will be dependent upon the number of ends of wire actually engaging the surface, this coefficient of friction can be controlled by determining the number of wire ends in each knot, the diameter of the wire used, as well as the total number of knots used. Generally, the more knots used, and the more wires per knot will increase the coefficient of friction as the number of points in contact is thereby increased. Likewise, the stiffness of the stainless steel wire utilized is critical as this allows the knots 22 to ride over a rough terrain by bending up toward the frame 2. Particularly, where it is anticipated that rough terrain will be traversed, this criterion must be given great importance. Naturally, the stiffness will depend on the stainless steel utilized as well as the length of the knots utilized from their mounting through the eyes 23 on the rods 20. Generally, the skid will be able to go over raised portions in the landing surface such as curbs, rocks, or bumps about ½ the height of the knots without any damage or undue stress on the skid device.

In construction, the invention anticipates that the knots 22 will be performed to meet the desired specification and then threaded onto the rods 20 as the rods are slidably moved into position. Of course, other construction means could be utilized such as assembling the knots directly onto the rods and then moving the rods up through slots in the brackets 5 and welding the rods into position.

Thus, it is seen that the knots 22 threaded onto the rods 20 through eyes 23 and pressed in close spaced relationship in both the longitudinal and lateral direction form an extremely rigid and stable wire brush type skid device. However, in some instances it may be desirable to secure the eye ends 23 of the knots 22 into a more permanently fixed relationship with respect to the rods 20 and the frame 2 so as to stiffen the knots 22. In this instance a suitable mechanical mechanism could be incorporated, or a hardening material such as an epoxy resin could be poured in liquid condition over the desired area and allowed to harden. Either of these techniques would provide stiffer knots 22.

It is anticipated that the device 1 will normally be pivoted with the forward end upward towards the airplane so that the rearward end will hit the ground surface first upon landing. To this end, a pressure strap 30, indicated in FIGURE 1, is affixed to the forward end of the top channels 7 and 8 of the frame 2 and is adapted to be connected to an aircraft (not shown). This strap is generally substantially rigid and holds the device 1 in fixed relationship with relation to the aircraft until the rearward end of the device 1 hits the ground causing a force around the pivot point 14 to break the pressure strap 30 allowing the device 1 to pivot and engage substantially the entire bottom wire end portions 24 of the knots 22 to effect the friction skid landing desired.

Thus, it is seen that the objects of the invention have been achieved by providing a wire brush ski type landing gear which utilizes a plurality of wire knots securely connected to a supporting frame and particularly strengthened in fixed relation in the longitudinal direction where the flexibility or length of the wire can be varied to control the amount of roughness which the skid can land on, and the number of knots and the number of wires in each knot can be varied to control the coefficient of friction resultant upon landing.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In a landing skid for an aircraft the combination of ski shape frame means,
   a plurality of rods operatively mounted substantially parallel to the frame means and to each other in equally spaced adjacent relationship so the rods together substantially define a ski shaped bottom to said frame means,
   a plurality of twisted wire knot means having eyes at one end and cut wire ends at the other end operatively mounted with the eyes receiving one of said rods so that the knot means are packed together in closely spaced longitudinal and lateral relationship extending downwardly from said frame means so that the wire ends define a ski shape, and
   means operatively affixed to said frame means to pivotally mount said frame means to said aircraft so the frame means is substantially parallel to the flight path of said aircraft and pivotal in a vertical plane parallel to the flight path of said aircraft.

2. In a landing skid for an aircraft the combination of an elongated frame having a ski shaped bottom surface,
   a plurality of rods operatively mounted longitudinally to said frame and being in equally spaced adjacent relationship to substantially conform to the ski shaped bottom surface thereof,
   a plurality of wire knot means defining eyes at one end and wire ends at the other having the eyes slidably received on said rods in close spaced relation along the entire length thereof so the wire ends extend substantially normal to the ski shaped bottom surface and thereby define a ski shaped bottom surface with said wire ends, and
   means to pivotally mount said frame to said aircraft in alignment with the flight path thereof so the curved portion of the ski shaped bottom surface defined by said wire ends of said wire knot means is forward and the frame can pivot in either direction in a vertical plane parallel to the flight path of the aircraft.

3. In a landing skid for an aircraft the combination of an elongated frame having a ski shaped bottom surface,
   a plurality of rods operatively mounted longitudinally to said frame and being in equally spaced adjacent relationship to substantially conform to the ski shaped bottom surface thereof,
   a plurality of wire knot means defining eyes at one end and wire ends at the other having the eyes slidably received on said rods in close spaced relation along the entire length thereof so the wire ends extend substantially normal to the ski shaped bottom surface and thereby define a ski shaped bottom surface with said wire ends, the number of wire ends in said wire knot means defining the exposed landing surface and controlling the coefficient of friction for the skid, and said wire knot means being flexible to allow the skid to traverse projections of having a height of about ½ the length of said wire knot means.

4. In a landing skid for an aircraft the combination of an elongated frame having a ski shaped bottom surface, a plurality of rods operatively mounted longitudinally to said frame and being in equally spaced adjacent relationship to substantially conform to the ski shaped bottom surface thereof, a plurality of wire knot means defining eyes at one end and wire ends at the other having the eyes slidably received on said rods in close spaced relation along the entire length thereof so the wire ends extend substantially normal to the ski shaped bottom surface and thereby define a ski shaped bottom surface with said wire ends, means to fixedly secure the ends of said wire knot means defining the eyes in fixed relation with said rods, said frame and each other, and means to pivotally mount said frame to said aircraft in alignment with the flight path thereof so the curved portion of the ski shaped bottom surface defined by said wire ends of said wire knot means is forward and the frame can pivot in either direction in a vertical plane parallel to the flight path of the aircraft.

5. In a landing skid for an aircraft the combination of an elongated frame having a ski-shaped bottom surface, a plurality of wire knot means received in said frame, said wire knot means containing a plurality of wires having cut wire ends at one end, and means mounting said wire knot means in said frame so that the knot means are packed together in closely spaced longitudinal and lateral relationship over the entire ski-shaped bottom surface thereof with the cut wire ends of each wire knot means extending substantially normal to the ski-shaped bottom surface of said frame so that the wire ends define a ski shape.

6. A landing skid according to claim 5 including means operatively affixed to said frame to pivotally mount said frame to said aircraft so the frame means is substantially parallel to the flight path of said aircraft and pivotal in a vertical plane parallel to the flight path of said aircraft.

References Cited by the Examiner

UNITED STATES PATENTS

| | | | |
|---|---|---|---|
| 1,790,394 | 1/1931 | Von Diersburg | 280—11.13 |
| 2,287,252 | 6/1942 | Kaufmann | 280—11.13 |

FOREIGN PATENTS 28,551  12/1924  France.

MILTON BUCHLER, *Primary Examiner.*

L. C. HALL, *Assistant Examiner.*